(12) United States Patent
Kunimatsu

(10) Patent No.: US 6,175,370 B1
(45) Date of Patent: *Jan. 16, 2001

(54) GEOMETRY TRANSLATION PROCESSOR

(75) Inventor: Atsushi Kunimatsu, Tokyo (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/797,661

(22) Filed: Jan. 31, 1997

(30) Foreign Application Priority Data

Feb. 2, 1996 (JP) .................................................... 8-017896

(51) Int. Cl.[7] ..................................................... G06F 15/00
(52) U.S. Cl. ............................................................. 345/434
(58) Field of Search .................................. 345/434, 433, 345/117, 118, 441, 442

(56) References Cited

U.S. PATENT DOCUMENTS

| | | | |
|---|---|---|---|
| 4,912,659 | * 3/1990 | Liang | 364/521 |
| 5,031,114 | * 7/1991 | Yamagami | 345/434 |
| 5,559,937 | * 9/1996 | Takeda | 395/134 |
| 5,689,627 | * 11/1997 | Arai et al. | 395/123 |

\* cited by examiner

*Primary Examiner*—Phu K. Nguyen
(74) *Attorney, Agent, or Firm*—Foley & Lardner

(57) ABSTRACT

A geometry translation processor used when drawing a polygon on a display translates coordinates and efficiently carries out a clipping test to determine whether or not the polygon must be clipped on the display. The processor has operation units (5$x$, 5$y$, 5$z$), clipping comparators (4$x$, 4$y$, 4$z$) provided for the operation units, respectively, and a clipping register (6). The clipping comparators compare the elements ($x_n$, $y_n$, $z_n$) of a translated coordinate vector with the remaining element ($w_n$) of the same vector. The clipping register is used to store the outputs of the clipping comparators and speedily carry out the clipping test.

24 Claims, 7 Drawing Sheets

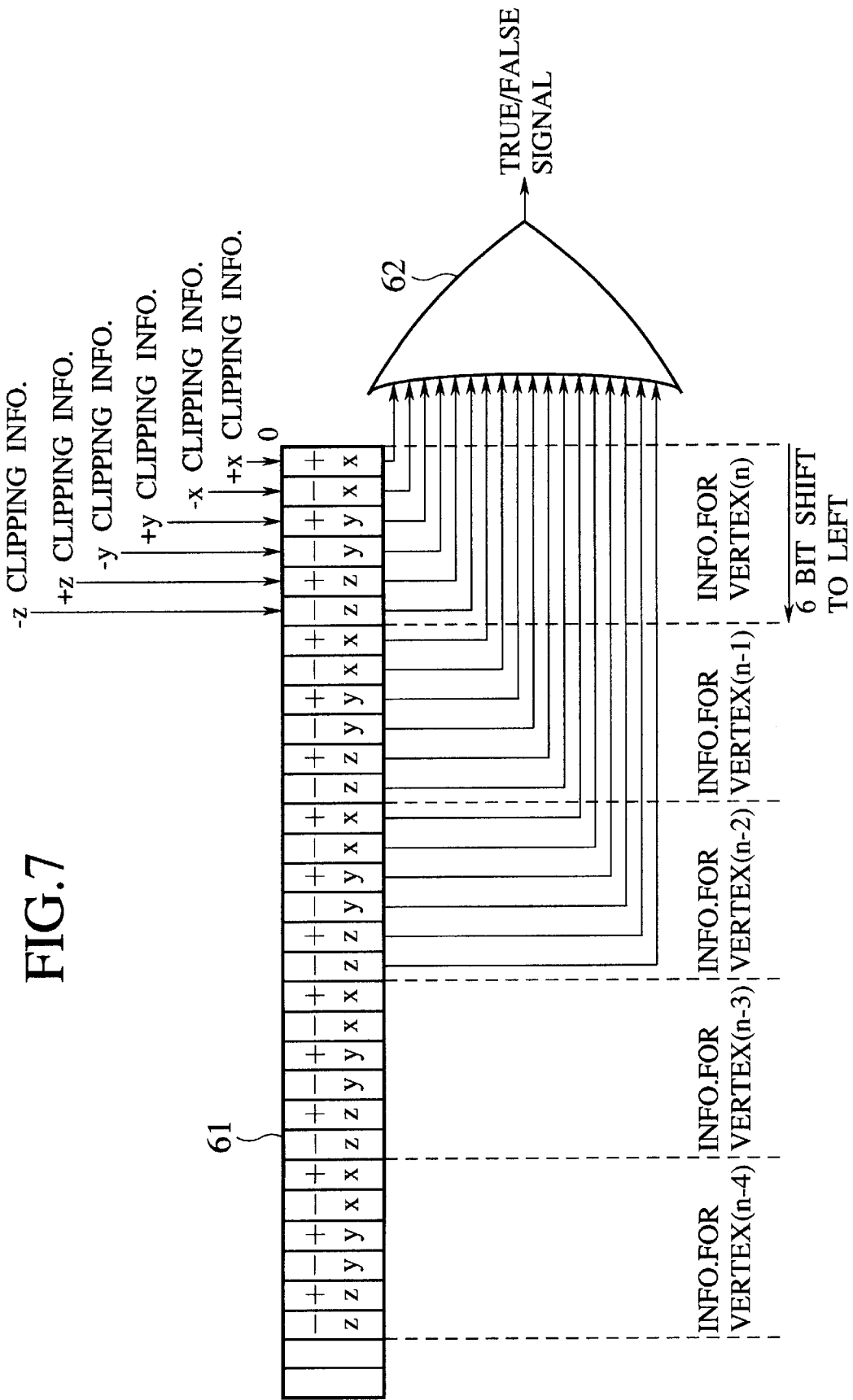

GEOMETRY TRANSLATION PROCESSOR

BACKGROUND OF THE INVENTION

1. Field of the Invention

The present invention relates to a geometry translation processor incorporated in a floating-point processor, for carrying out geometry translation when drawing graphics on a display.

2. Description of the Prior Art

When drawing a polygon on a display, it is necessary to translate the three-dimensional coordinates of each vertex of the polygon into two-dimensional ones. The translation is achieved by calculating the product of a 4-by-4 matrix and a 4-element vector. After the translation, each vertex of the polygon is checked to see if it is within a display area, to determine whether the vertex must be clipped or displayed as it is.

For example, an output coordinate vector (x', y', z', w') is obtained as the product of an input coordinate vector (x, y, z, 1) and the following matrix:

$$\begin{pmatrix} a, & b, & c, & d \\ e, & f, & g, & h \\ i, & j, & k, & l \\ m, & n, & o, & p \end{pmatrix}$$

The product is calculated as follows:

$$(x', y', z', w') = (x, y, z, 1)(a, b, c, d)$$
$$(e, f, g, h)$$
$$(i, j, k, l)$$
$$(m, n, o, p)$$
$$= (ax + ey + iz + lm, bx + fy + jz + ln,$$
$$cx + gy + kz + lo + dx + hy + lz + lp)$$

The calculation is executed at high speed with four multiply-add calculation units by operating them four times in parallel. After translation, every coordinate is checked to see if it is within a display area, to determine whether it must be clipped or displayed as it is.

A translated point having the coordinates (x', y', z', w') is within the display area, if the following are satisfied:

$$-|w'| < x' < |w'| \quad (1)$$
$$-|w'| < y' < |w'| \quad (2)$$
$$-|w'| < z' < |w'| \quad (3)$$

Checking a given point to see if it is within a display area is called a clipping test.

If a given point is out of a display area, the following are tested:

if $|x'| < -|w'|$ then the point is out in a negative x-direction (4)

if $|x'| > |w'|$ then the point is out in a positive x-direction (5)

if $|y'| < -|w'|$ then the point is out in a negative y-direction (6)

if $|y'| > |w'|$ then the point is out in a positive y-direction (7)

if $|z'| < -|w'|$ then the point is out in a negative z-direction (8)

if $|z'| > |w'|$ then the point is out in a positive z-direction (9)

The clipping test is carried out on each vertex of a given polygon after geometry translation. When drawing a polygon having n vertexes, the clipping test is carried out n times to test every vertex. If every vertex of the polygon is in a display area, the polygon is drawn as it is. If any one of the vertexes is out of the display area, the polygon is partly clipped and displayed. If every vertex is out of the display area, there will be two cases. In one case, every vertex is out of the display area in a given direction, to satisfy, for example, the expression (4). In this case, the polygon is not drawn. In the other case, one vertex may satisfy the expression (4) and the others the expression (5). Then, the polygon is partly clipped and displayed.

FIG. 1 shows a geometry translation processor for carrying out geometry translation and clipping tests according to a prior art. This processor is incorporated in a floating-point processor.

The floating-point processor is a coprocessor, and therefore, instructions for the processor are fetched and decoded by a main processor. Conditional branching is carried out by the main processor in response to a signal TRUE/FALSE sent from the coprocessor.

The geometry translation processor has a 128-bit source bus 1, a 128-bit source bus 2, a 128-bit destination bus 3, a register block 4, and operation units 7x, 7y, 7z, and 7w. Bit lines of each of the 128-bit buses are divided into four groups each including 32 bit lines. The groups are called x-, y-, z-, and w-groups.

FIG. 2 shows the details of the register block 4 containing 64 registers R0 to R63. The x-group bit lines of the source bus 2 and destination bus 3 are connected to the registers R0, R4, R8, and the like whose register numbers are each divisible by four. The y-group bit lines of the buses 2 and 3 are connected to the registers R1, R5, R9, and the like whose register numbers provide each a remainder of 1 when divided by four. The z-group bit lines of the buses 2 and 3 are connected to the registers R2, R6, R10, and the like whose register numbers provide each a remainder of 2 when divided by four. The w-group bit lines of the buses 2 and 3 are connected to the registers R3, R7, R11, and the like whose register numbers provide each a remainder of 3 when divided by four. The bit lines of the source bus 1 are connected to all registers of the register block 4, to form a crossbar structure.

FIG. 3 shows the details of the operation units 7x, 7y, 7z, and 7w. These units are multiply-add calculation units FMACx, FMACy, FMACz, and FMACw, which are capable of calculating multiply-add, multiplication, addition, and subtraction in parallel. A special operation such as comparison is carried out by the unit 7w.

The units 7x to 7w calculate a 4-by-4 matrix at high speed in geometry translation. Examples of instructions and a program used for calculating a matrix will be explained.

Any numeral having a prefix of "R" represents a register number.

FMUL: Carry out four multiplications in parallel
Example: FMUL R20–R23, R16, R0–R3
R20←R16×R0
R21←R16×R1
R22←R16×R2
R23←R16×R3
FMAC: Carry out four multiplications in parallel
Example: FMAC R20–R23, R16, R0–R3
R20←R20+R16×R0
R21←R21+R16×R1
R22←R22+R16×R2
R23←R23+R16×R3
FNEG: Invert the sign of a floating-point number Example: FNEG R0, R1
R0=−(R1)
FCMP: Compare floating-point numbers with each other. A result is sent as a signal TRUE/FALSE to the main processor.
Examples:
FCMP eq R0, R1; if R0=R1 then TRUE, and if not then FALSE
FCMP ne R0, R1; if not R0=R1 then TRUE, and if R0=R1 then FALSE
FCMP gt R0, R1; if R0>R1 then TRUE, and if not then FALSE
FCMP le R0, R1; if R0<=R1 then TRUE, and if not then FALSE
FCMP lt R0, R1; if R0<R1 then TRUE, and if not then FALSE
FCMP ab R0, R1; if R0>32 R1 then TRUE, and if not then FALSE
BCT: Branch to a label if TRUE
Example: BCT label
An example of a program for carrying out the geometry translation and clipping test on a triangle with the use of the above instructions will be explained.
Vertex coordinates of the triangle before translation are stored in the following registers:
Vertex 1: (R0, R1, R2, R3)
Vertex 2: (R4, R5, R6, R7)
Vertex 3: (R8, R9, R10, R11)
A perspective translation matrix is stored as follows:

$$\begin{pmatrix} R16, & R17, & R18, & R19 \\ R20, & R21, & R22, & R23 \\ R24, & R25, & R26, & R27 \\ R28, & R29, & R30, & R31 \end{pmatrix}$$

Vertex coordinates of the triangle after translation are stored in the following registers:
Vertex 1: (R32, R33, R34, R35)
Vertex 2: (R36, R37, R38, R39)
Vertex 3: (R40, R41, R42, R43)
Start of program list 1;
Coordinate translation of vertex 1
FMUL R32–R35, R0, R16–R19
FMAC R32–R35, R1, R20–R23
FMAC R32–R35, R2, R24–R27
FMAC R32–R35, R3, R28–R31;
Coordinate translation of vertex 2
FMUL R35–R39, R4, R16–R19
FMAC R35–R39, R5, R20–R23
FMAC R36–R39, R6, R24–R27
FMAC R36–R39, R7, R28–R31;
Coordinate translation of vertex 3
FMUL R40–R43, R8, R16–R19
FMAC R40–R43, R9, R20-423
FMAC R40–R43, R10, R24–R27
FMAC R40–R43, R11, R28–R31;
Clipping test with w being positive;
Vertex 1
FCMP gt R32, R35; if x>w at vertex 1 then
BCT label; jump to clipping process
FCMP gt R33, R35; if y>w at vertex 1 then
BCT label; jump to clipping process
FCMP gt R34, R35; if z>w at vertex 1 then
BCT label; jump to clipping process
FNEG gt R35, R35; R35=−(R35)
FCMP lt R32, R35; if x<−w at vertex 1 then
BCT label; jump to clipping process
FCMP lt R33, R35; if y<−w at vertex 1 then
BCT label; jump to clipping process
FCMP lt R34, R35; if z<−w at vertex 1 then
BCT label; jump to clipping process;
Vertex 2
FCMP gt R36, R39; if x>w at vertex 2 then
BCT label; jump to clipping process
FCMP gt R37, R39; if y>w at vertex 2 then
BCT label; jump to clipping process
FCMP gt R38, R39; if z>w at vertex 2 then
BCT label; jump to clipping process
FNEG gt R39, R39; R39=−(R39)
FCMP lt R36, R39; if x<−w at vertex 2 then
BCT label; jump to clipping process
FCMP lt R37, R39; if y<−w at vertex 2 then
BCT label; jump to clipping process
FCMP lt R38, R39; if z<−w at vertex 2 then
BCT label; jump to clipping process;
Vertex 3
FCMP gt R40, R43; if x>w at vertex 3 then
BCT label; jump to clipping process
FCMP gt R41, R43; if y>w at vertex 3 then
BCT label; jump to clipping process
FCMP gt R42, R43; if z>w at vertex 3 then
BCT label; jump to clipping process
FNEG gt R43, R43; R43=−(R43)
FCMP lt R40, R43; if x<−w at vertex 3 then
BCT label; jump to clipping process
FCMP lt R41, R43; if y<−w at vertex 3 then
BCT label; jump to clipping process
FCMP lt R42, R43; if z<−w at vertex 3 then
BCT label; jump to clipping process
End of program list 1

In this way, the prior art carries out geometry translation by combining comparison instructions each between two numbers and branching instructions. The clipping test of the prior art involves many comparison and branching steps, to deteriorate performance and efficiency.

SUMMARY OF THE INVENTION

An object of the present invention is to provide a geometry translation processor capable of efficiently carrying out geometry translation and clipping tests.

In order to accomplish the object, an aspect of the present invention provides a geometry translation processor having four geometry translation circuits for perspectively translating an input coordinate vector (x, y, z, 1) into an output coordinate vector (x', y', z', w'), three comparator circuits provided for three of the geometry translation circuits, respectively, for comparing three elements (x', y', z') of the output coordinate vector with the remaining element (w') thereof, to determine whether or not the three elements are within a display area, and a clipping register for storing the outputs of the comparator circuits.

Each of the elements (x', y', z', w') of the output coordinate vector includes a sign and an absolute value. Each of the comparator circuits has a comparator for comparing the absolute value of a corresponding one of the three elements (x', y', z') with the absolute value of the remaining element (w'), a first circuit for providing an AND of the output of the comparator and the sign of the corresponding element, and a second circuit for providing an AND of the output of the comparator and an inversion of the sign of the corresponding element.

The clipping register is a shift register for shifting and storing the outputs of the comparator circuits.

Each of the comparator circuits provides a signal indicating that a corresponding one of the three elements (x', y', z') of the output coordinate vector is out of the display area if the corresponding element is below or above the remaining element (x'>|w'| or x'<-|w'|, y'>|w'| or y'<-|w'|, z'>|w'| or z'<-|w'|).

Each of the comparator circuits provides a 2-bit identification signal that indicates one of the facts that a corresponding one of the three elements (x', y', z') of the output coordinate vector is within the display area, that the corresponding element is out of the display area in a positive direction, and that the corresponding element is out of the display area in a negative direction.

The clipping register may be a shift register of "6×n" bits with "n" being greater than 1. Every six bits of the shift register receive the identification signals from the comparator circuits and are shifted to be ready for receiving the next identification signals from the same.

The shift register is of at least 18 bits and is connected to an output circuit that provides an OR of the 18 bits.

BRIEF DESCRIPTION OF THE DRAWINGS

FIG. 7 shows a clipping register contained in the processor of FIG. 5.

DETAILED DESCRIPTION OF THE EMBODIMENTS

Figure 4:
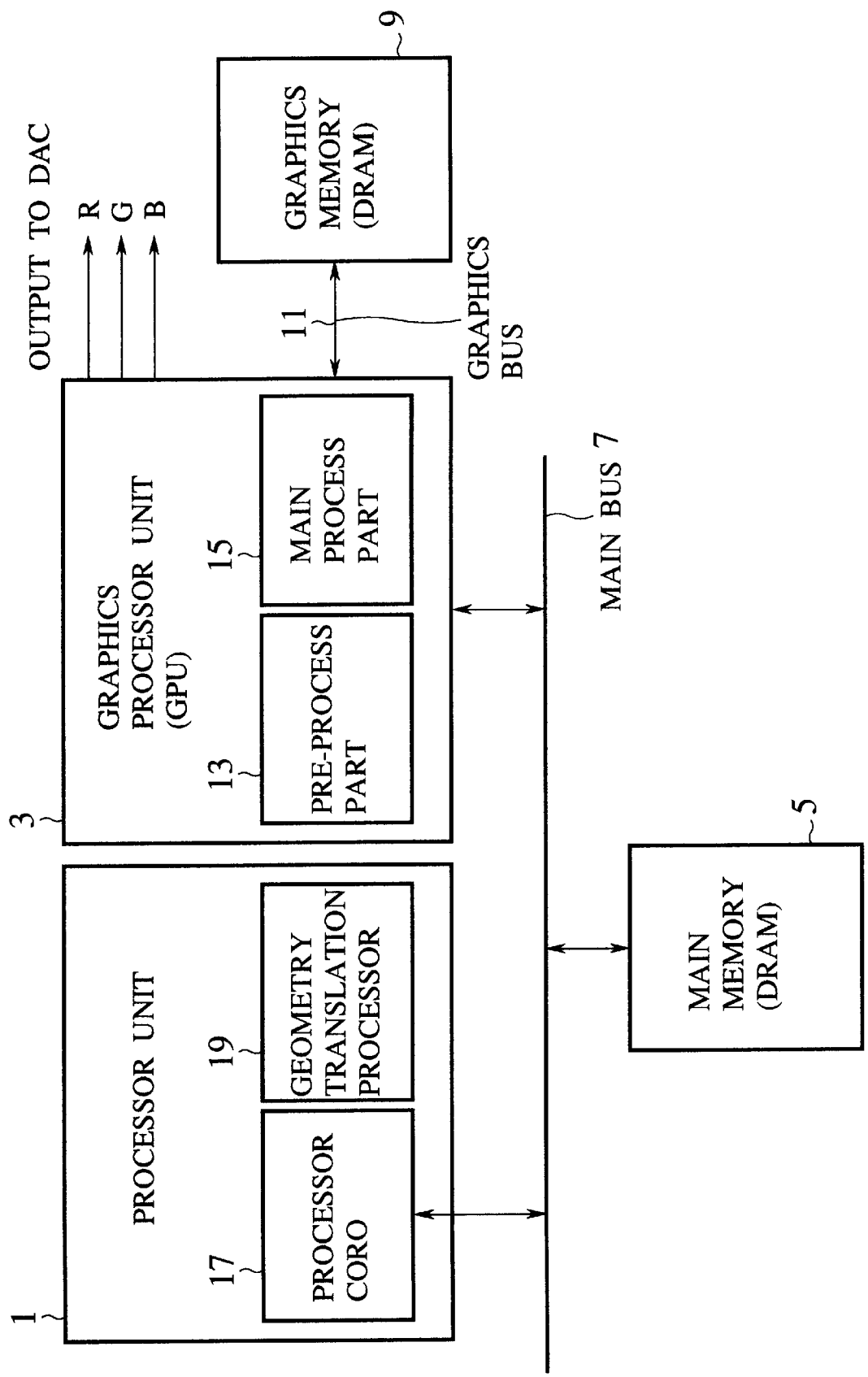
FIG. 4 shows a graphics processing system employing a geometry translation processor according to an embodiment of the present invention.

FIG. 4 shows a graphics processing system employing a geometry translation processor according to an embodiment of the present invention.

The system has a processor unit 1, a graphics processor unit (GPU) 3, and a main memory 5, which are connected to one another through a main bus 7. The GPU 3 is connected to a graphics memory 9 through a graphics bus 11.

The GPU 3 has a pre-process part 13 and a main process part 15. The main process part 15 employs digital differential analyzers (DDAs), to read texture information from the graphics memory 9, carry out rendering on pixels, and write a resultant image in a frame buffer in the graphics memory 9. The pre-process part 13 calculates parameters such as initial and differential values for the DDAs of the main process part 15.

The processor unit 1 has a processor core 17, which reads a program from the main memory 5 and executes the same. According to the program, the processor core 17 generates GPU command information such as the two-dimensional coordinates and color information of each vertex of a polygon to draw. The processor core 17 employs the geometry translation processor 19 for translating three-dimensional coordinates into two-dimensional coordinates. According to the program, the processor unit 1 adds, to the GPU command information, an identification command indicating the kind of the polygon to draw. According to the GPU command information and additional information, the processor unit 1 generates a GPU command and sends it to the GPU 3 through the main bus 7, so that the GPU 3 may draw the polygon. The GPU command may be sent through a dedicated bus instead of the main bus 7. A speed of sending the GPU command of the processor unit 1 may not be equal to a speed of drawing the polygon of the GPU 3. In this case, the main memory 5 buffers the GPU command, to absorb the speed difference.

Figure 1:
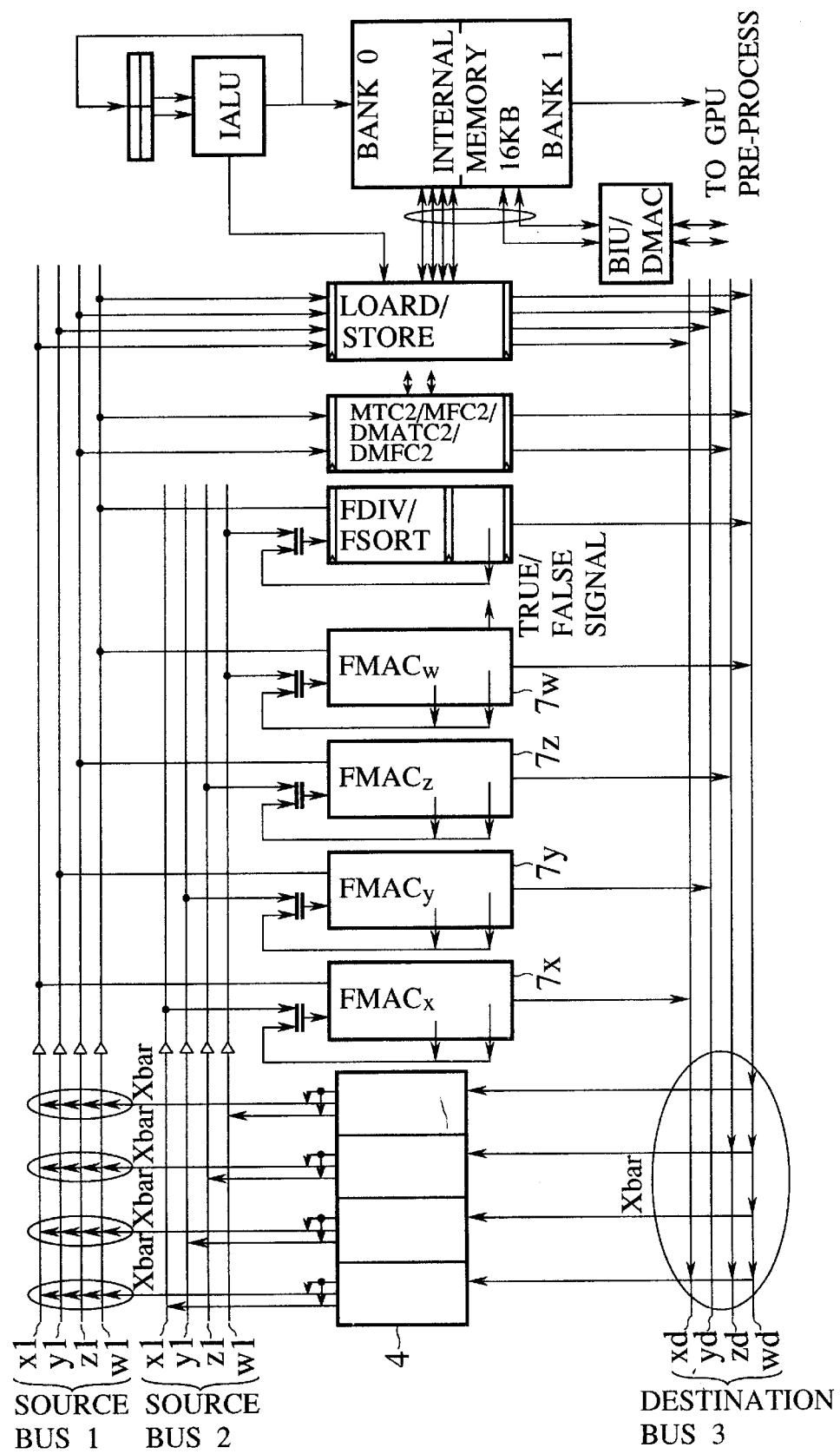
FIG. 1 shows a geometry translation processor according to a prior art.
Figure 2:
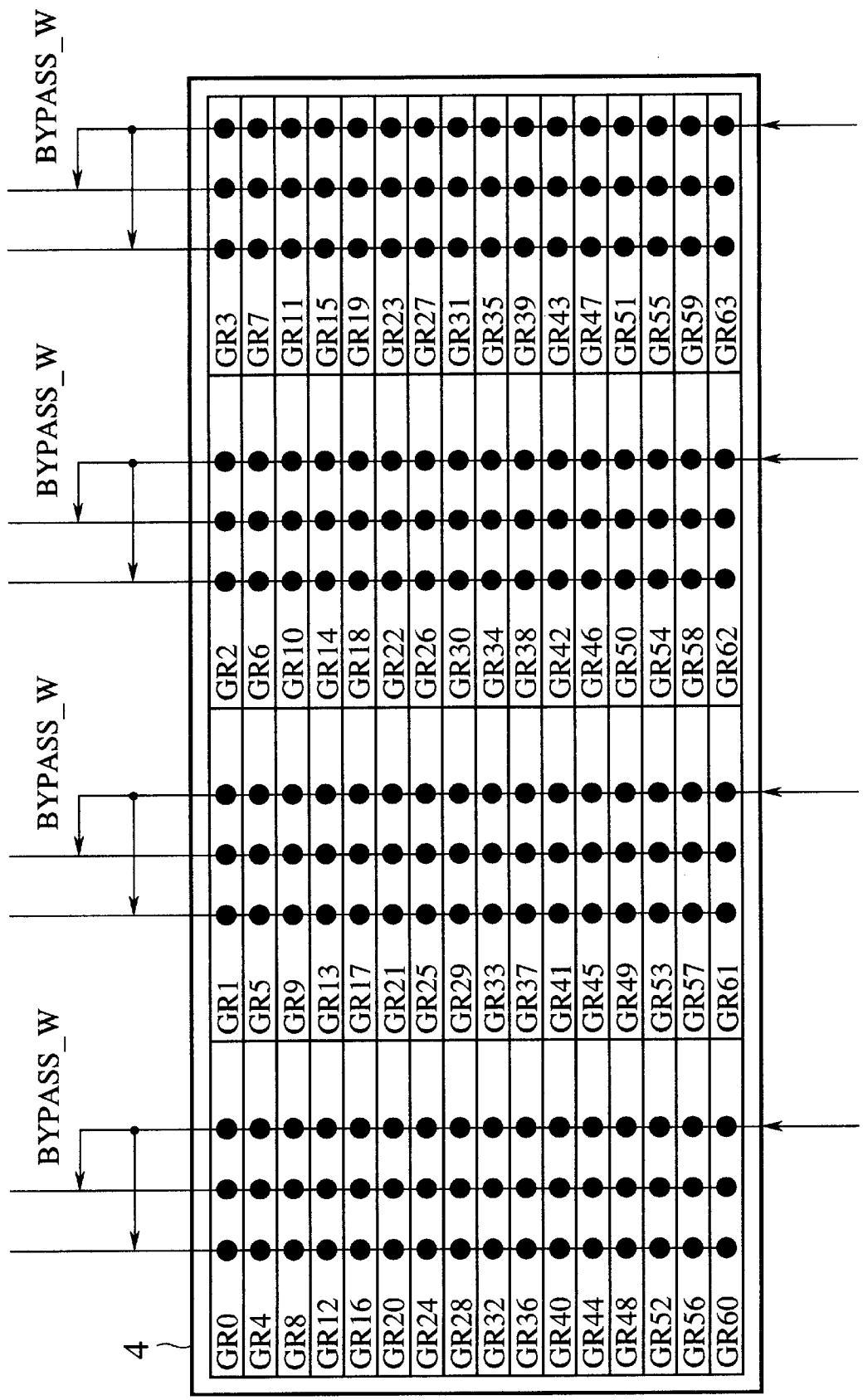
FIG. 2 shows a register block contained in the processor of FIG. 1.
Figure 3:
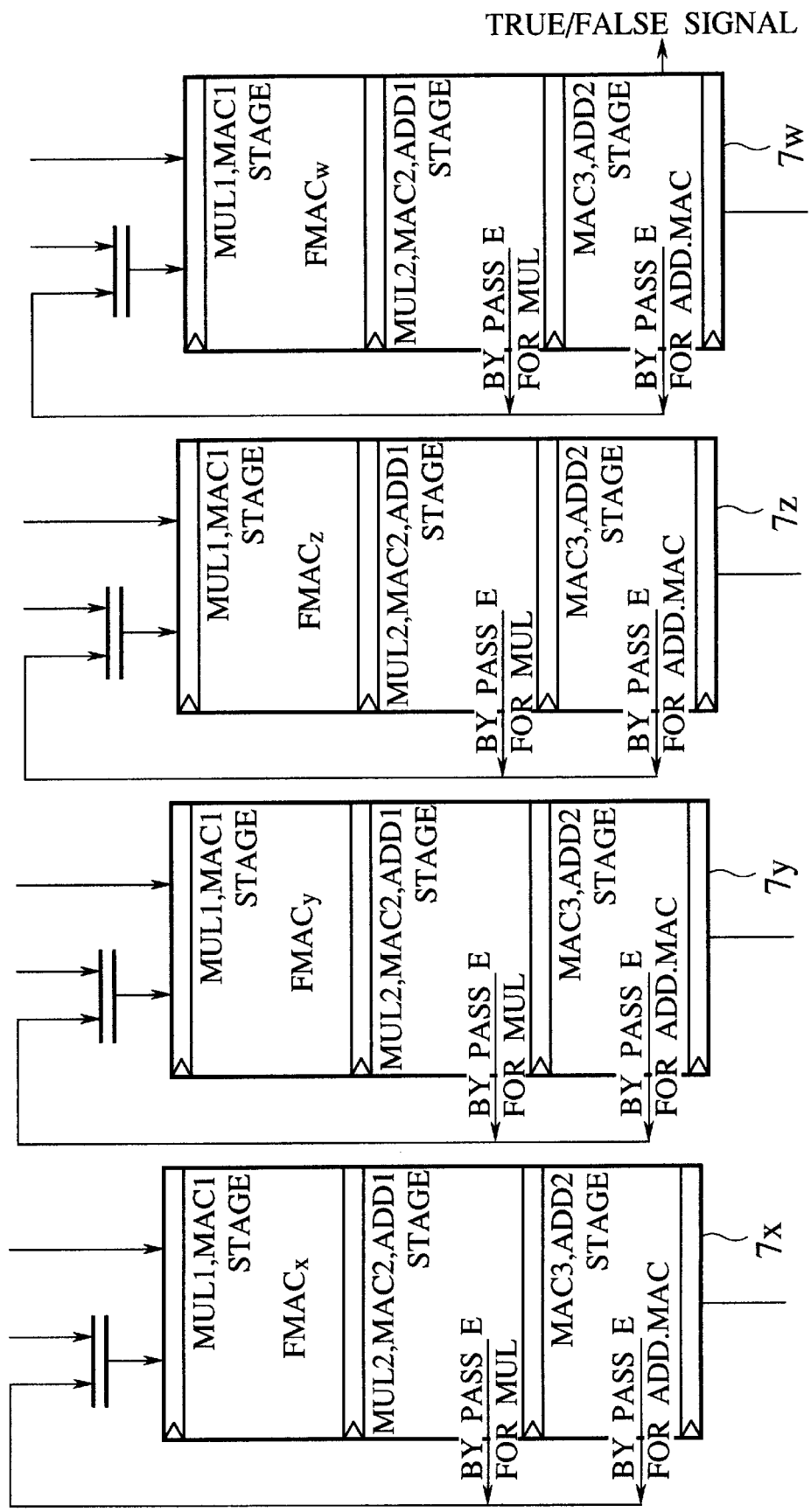
FIG. 3 shows operation units contained in the processor of FIG. 1.
Figure 5:
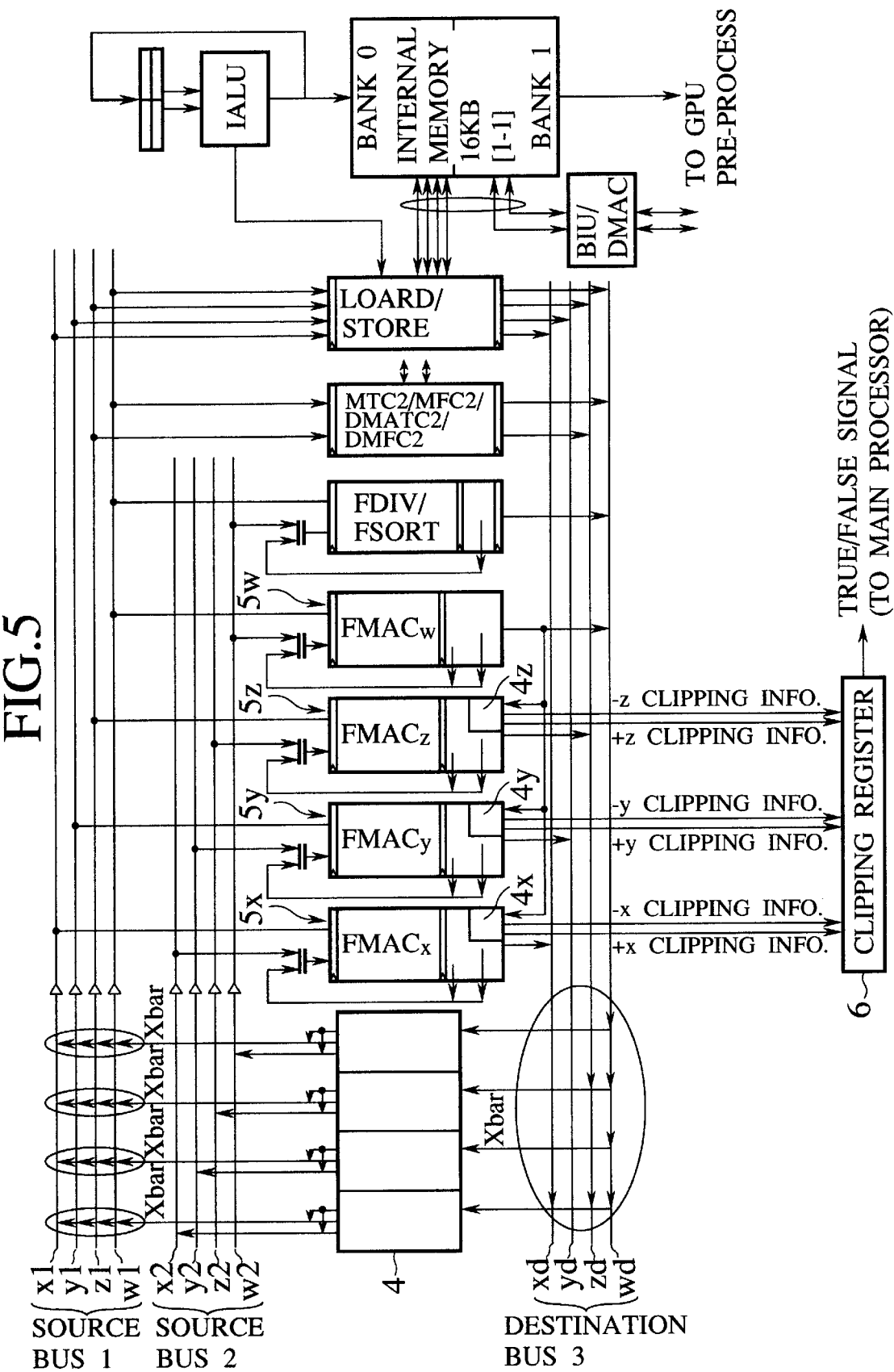
FIG. 5 shows the details of the geometry translation processor of FIG. 4.

FIG. 5 shows the details of the geometry translation processor 19. The processor 19 has operation units 5x, 5y, and 5z incorporating clipping comparators 4x, 4y, and 4z, respectively. The processor 19 also has an operation unit 5w and a clipping register 6. The other arrangements of the processor 19 are the same as those of the prior art of FIG. 1.

Figure 6:
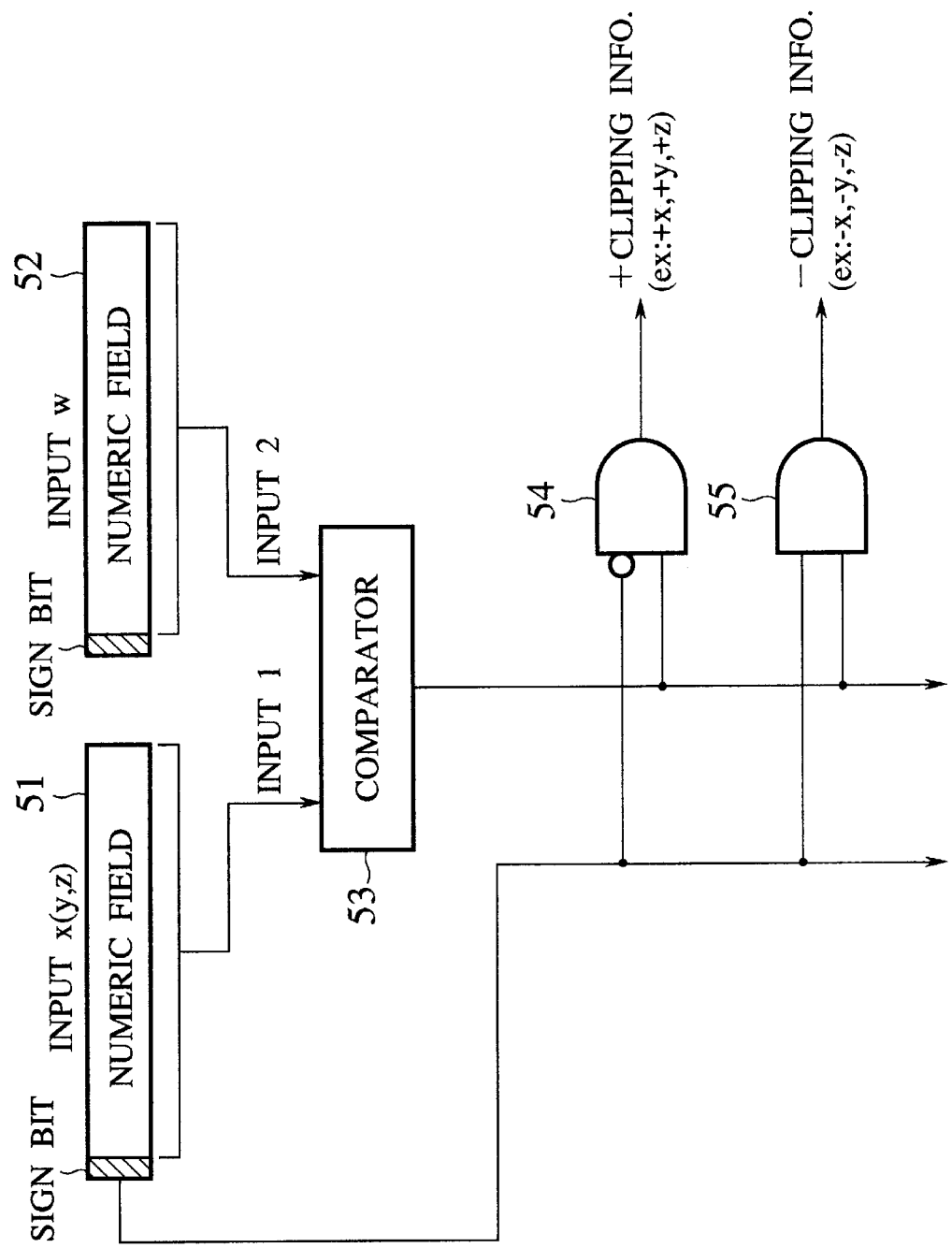
FIG. 6 shows a clipping comparator contained in the processor of FIG. 5.

FIG. 6 shows the details of any one of the clipping comparators 4x, 4y, and 4z. The clipping comparator compares an element xn (yn, zn) of an output coordinate vector (xn, yn, zn, wn) of a vertex n of a given polygon after translation with an element wn of the same output coordinate vector, to see if xn>|wn|, xn<-|wn|, xn>=|wn|, or xn<=-|wn|( yn>|wn|, yn<-|wn|, yn>=|wn|, or yn<=-|wn|, or zn>|wn|, zn<-|wn|, zn>=|wn|, or zn<=-|wn|) and provide a comparison result in response to a single comparison instruction. The clipping comparator has input registers 51 and 52, a comparator 53, and AND gates 54 and 55. The input register 51 stores the vector element xn (yn, zn) with the sign thereof. The input register 52 stores the vector element wn with the sign thereof. The comparator 53 compares the vector elements stored in the input registers 51 and 52 with each other. The AND gate 54 receives the output of the comparator 53 and an inversion of the sign stored in the input register 51 and checks to see if xn (yn, zn)>wn, or xn (yn, zn)>=wn. The AND gate 55 receives the output of the comparator 53 and the sign stored in the input register 51 and checks to see if xn (yn, zn)<-wn or xn (yn, zn)<=-wn.

FIG. 7 shows the details of the clipping register 6. The clipping register 6 has a shift register 61 and an OR gate 62. The OR gate 62 provides an OR of right 18 bits of the shift register 61.

In response to the comparison instruction, the shift register 61 carries out a 6-bit left shift and receives the outputs of the clipping comparators 4x, 4y, and 4z. Namely, the shift register 61 shifts the coordinates (xn-1, yn-1, zn-1) of the preceding vertex (n-1) of a given polygon to the left and receives latest six bits from the clipping comparators 4x, 4y, and 4z. After data for n vertexes (three vertexes in the case of a triangle) are stored in the shift register 61, the OR gate 62 checks to see if each vertex is within a display area. If some vertex must be clipped, the OR gate 62 provides a branching instruction to carry out a clipping process.

The input registers 51 of the clipping comparators 4x, 4y, and 4z receive elements x, y, and z, respectively, of a given output coordinate vector (x, y, z, w) while the input register 52 of each clipping comparator receives an element w of the same vector.

For example, in the clipping comparator 4x, the input register 51 stores a numeric field of the element x and a sign thereof separately, and the input register 52 stores a numeric field of the element w and a sign thereof separately. The input registers 51 and 52 provide the comparator 53 with the numeric fields as inputs 1 and 2. Each numeric field represents a floating-point number consisting of an exponential part and a mantissa part.

The comparator 53 provides 1 if input 1 >input 2 or input 1 >=input 2, and 0, if not so. An inversion of the sign of the element x is transferred to the AND gate 54, and the sign of the element x is transferred as it is to the AND gate 55.

If |x|>|w| and x>=0, i.e., if x>w, the AND gate 54 provides an output +x Clipping Info. of 1. If |x|>|w| and x<0, i.e., if x<-w, the AND gate 55 provides an output -x Clipping Info. of 1. Here, the element w is supposed to be positive.

The outputs +x Clipping Info., +y Clipping Info., +z Clipping Info., -x Clipping Info., -y Clipping Info., and -z Clipping Info. of the clipping comparators 4x, 4y, and 4z are supplied to the clipping register 6.

The clipping comparators 4x, 4y, and 4z are simultaneously operated in response to an instruction FCLIP. The instruction FCLIP executes 6-bit left shift, comparison, and clipping test. This will be explained in detail.

Example: FCLIP R0–R3, R4

(1) First operation

The shift register 61 carries out a 6-bit left shift.

(2) Second operation

The clipping comparator 4x compares R0 (x) with R4 (w), the clipping comparator 4y compares R1 (y) with R4 (w), and the clipping comparator 4z compares R2 (z) with R4 (w).

(3) Third operation

The clipping test is carried out. If any one of lower 18 bits of the shift register 61 is 1, a signal TRUE is sent to the main processor.

The first and second operations are independent of each other, and therefore, are carried out simultaneously.

In FIG. 7, the shift register 61 is of 32 bits and lowest six bits are connected to the outputs of the clipping comparators 4x, 4y, and 4z. Namely, bits 0 to 5 thereof are connected to the outputs +x Clipping Info., -x Clipping Info., +y Clipping Info., -y Clipping Info., +z Clipping Info., and -z Clipping Info., respectively.

Whenever the instruction FCLIP is carried out, the shift register 61 carries out a 6-bit left shift. Accordingly, the bits 0 to 5 thereof store clipping information about the latest vertex of a given polygon, the bits 6 to 11 store clipping information about the first preceding vertex of the polygon, the bits 12 to 17 store clipping information about the second preceding vertex of the polygon, the bits 18 to 23 store clipping information about the third preceding vertex of the polygon, and the bits 24 to 29 store clipping information about the fourth preceding vertex of the polygon.

In the case of a triangle, there are three vertexes, and each of which is subjected to the clipping test. Namely, the OR gate 62 determines whether or not any one of the bits 0 to 17 of the register 61 is 1. If any one of the bits is 1, a signal TRUE is sent to the main processor, and a branching instruction is executed to carry out the clipping process.

The clipping comparators 4x, 4y, and 4zof the present invention reduce the number of comparison instructions required for the clipping test to one, thereby improving an operation speed. The clipping register 6 is capable of always holding clipping information about latest five vertexes. Namely, it can handle a triangle to a pentagon. The clipping comparators 4x, 4y, and 4zand clipping register 6 can shorten the program list 1 of the prior art to the following program list 2, thereby reducing the number of steps of the clipping test.

Start of program list 2;
Coordinate translation of vertex 1
FMUL R32–R35, R0, R16–R19
FMAC R32–R35, R1, R20–R23
FMAC R32–R35, R2, R24–R27
FMAC R32–R35, R3, R28–R31;
Coordinate translation of vertex 2
FMUL R35–R39, R4, R16–R19
FMAC R35–R39, R5, R20–R23
FMAC R36–R39, R6, R24–R27
FMAC R36–R39, R7, R28–R31;
Coordinate translation of vertex 3
FMUL R40–R43, R8, R16–R19
FMAC R40–R43, R9, R20-423
FMAC R40–R43, R10, R24–R27
FMAC R40–R43, R11, R28–R31;
Clipping test with w being positive
FCLIP R32–R34, R35, store clipping information about vertex 1 in clipping register
FCLIP R36–R38, R39; store clipping information about vertex 2 in clipping register
FCLIP R40–R42, R43; store clipping information about vertex 3 in clipping register
BCT label; jump to clipping process according to latest information about three vertexes
End of program list 2

Since the clipping register 6 stores all pieces of clipping information about a given polygon, it is easy to see if the polygon is within a display area.

In the case of a triangle, the clipping information +x of each of the vertexes 1 to 3 of the triangle is 1 if it is entirely out of a display area. In this case, there is no need of drawing the triangle. To test a triangle, the OR gate 62 may be replaced with one that provides an OR of the information +x of each of the vertexes 1 to 3 of the triangle.

The present invention is applicable not only to a triangle having three vertexes but also to a polygon having an optional number (n) of vertexes, where n>=3, by properly increasing the number of bits supplied to the OR gate 62 as well as the number of bits of the shift register 61.

As explained above, the present invention compares elements (xn, yn, zn) of an output coordinate vector after geometry translation with an element (wn) of the same vector according to a single comparison instruction. The present invention is capable of carrying out a clipping test in a short time with a reduced number of instructions in a program having a reduced number of steps. The present invention employs a dedicated register for storing comparison information to efficiently carry out the clipping test.

What is claimed is:

1. A geometry translation processor comprising:

four geometry translation circuits for perspectively translating an input coordinate vector (x, y, z, 1) into an output coordinate vector (x', y', z', w');

three comparator circuits provided for three of said geometry translation circuits, respectively, for comparing three elements (x', y', z') of the output coordinate vector with the remaining element (w') thereof, to determine whether or not the three elements are within a display area; and a clipping test circuit for sequentially receiving comparison results of said comparator circuits and judging in parallel on the basis of said comparison results, whether or not a plurality of the coordinate vectors as translated are within the display area.

2. The geometry translation processor of claim 1, wherein each of the elements (x', y', z', w') of the output coordinate vector includes a sign and an absolute value, and wherein each of said comparator circuits has:

a comparator for comparing the absolute value of a corresponding one of the three elements (x', y', z') with the absolute value of the remaining element (w');

a first circuit for providing an AND of the output of the comparator and the sign of the corresponding element; and a second circuit for providing an AND of the output of the comparator and an inversion of the sign of the corresponding element.

3. The geometry translation processor of claim 1, wherein said clipping test circuit includes a shift register for shifting and storing the outputs of said comparator circuits.

4. The geometry translation processor of claim 3, wherein said clipping test circuit is provided with a logic circuit which outputs logic signals on the basis of said comparison results as stored in said shift register corresponding to the plurality of the coordinate vectors.

5. The geometry translation processor of claim 4, wherein said logic circuit is comprised of a logic OR circuit.

6. The geometry translation processor of claim 1, wherein each of said comparator circuits provides a signal indicating that a corresponding one of the three elements (x', y', z') of the output coordinate vector is out of the display area if the corresponding element is below or above the remaining elements (x'>|w'| or x'<−|w'|, y'>|w'| or y'<−|w'|, z'>|w'| or z'<−|w'|).

7. The geometry translation processor of claim 4, wherein each of said comparator circuits provides a 2-bit identification signal that indicates one of the facts that a corresponding one of the three elements (x', y', z') of the output coordinate vector is within the display area, that the corresponding element is out of the display area in a positive direction, and that the corresponding element is out of the display area in a negative direction.

8. The geometry translation processor of claim 5, wherein said clipping test circuit includes a shift register of "6×n" bits with "n" being greater than 1, and every six bits of the shift register receive the identification signals from said comparator circuits and are shifted to be ready for receiving the next identification signals from the same.

9. The geometry translation processor of claim 6, wherein the shift register is of at least 18 bits and is connected to an output circuit that provides an OR of the 18 bits.

10. A geometry translation processor comprising:

four geometry translation circuits for perspectively translating an input coordinate vector (x, y, z, 1) into an output coordinate vector (x', y', z', w');

three comparator circuits provided for three of said geometry translation circuits, respectively, for comparing in a parallel manner three elements (x', y', z') of the output coordinate vector with the remaining element (w') thereof, to determine whether or not the three elements are within a display area; and a clipping test circuit for sequentially receiving comparison results of said comparator circuits and judging in parallel, on the basis of said comparison results, whether or not a plurality of the coordinate vectors as translated are within the display area.

11. A geometry translation processor comprising:

geometry translation circuitry for perspectively translating an input coordinate vector (x, y, z, 1) into an output coordinate vector (x', y', z', w') for each vertex of a polygon having n vertexes;

comparator circuitry for comparing three elements (x', y', z') of the output coordinate vector with the remaining element (w') thereof; and a clipping test circuit for sequentially receiving comparison results of said comparator circuits and judging in parallel, on the basis of said comparison results, whether or not a plurality of the coordinate vectors as translated are within the display area.

12. The geometry translation processor of claim 11, wherein said clipping test circuit includes a shift register for shifting and storing the outputs of said comparator circuits as received for each of said vertexes.

13. The geometry translation processor of claim 12, wherein said clipping test circuit is provided with a logic circuit which outputs logic signals on the basis of the comparison results as stored in said shift register for n vertexes.

14. The geometry translation processor of claim 13, wherein said logic circuit is comprised of a logic OR circuit.

15. The geometry translation processor of claim 13, wherein said comparator circuitry is adapted to output six-bit comparison results indicative of whether or not the following equations are satisfied with respect to each bit component, $|x'|<−|w'|, |x'|>−|w'|,$
$|y'|<−|w'|, |y'|>−|w'|,$
$|z'|<−|w'|, |z'|>−|w'|.$ 16. The geometry translation processor of claim 15, wherein said clipping test circuit includes a shift register for sequentially shifting and storing the six-bit comparison results with respect to each bit component.

17. The geometry translation processor of claim 16, wherein said clipping test circuit is provided with a logic circuit which outputs logic signals on the basis of (n×6)-bit comparison results of the comparison results as stored in said shift register for n vertexes.

18. The geometry translation processor of claim 17, wherein said logic circuit is comprised of a logic OR circuit.

19. The geometry translation processor of claim 16, wherein said clipping test circuit determines whether or not a plurality of the coordinate vectors as translated are within the display area on the basis of the comparison results stored in said shift register and the comparison results as sequentially input to said shift register for each of said vertexes.

20. The geometry translation processor of claim 12, wherein said clipping test circuit determines whether or not a plurality of the coordinate vectors as translated are within the display area on the basis of the comparison results stored in said shift register and the comparison results as sequentially input to said shift register for each of said vertexes.

21. A geometry translation processor comprising:

geometry translation circuitry for perspectively translating an input coordinate vector (x, y, z, 1) into an output coordinate vector (x', y', z', w') for each vertex of a polygon having n vertexes;

comparator circuitry adapted to output six-bit comparison results indicative of whether or not the following equations are satisfied with respect to each bit component.

$|x'|<-|w'|, |x'|>-|w'|,$
$|y'|<-|w'|, |y'|>-|w'|,$
$|z'|<-|w'|, |z'|>-|w'|,$ a shift register for sequentially shifting and storing the six-bit comparison results with respect to each vertex; and a logic circuit which outputs logic signals on the basis of (n×6)-bit comparison results of the comparison results as stored in said shift register for n vertexes.

22. The geometry translation processor of claim 21, wherein said logic circuit is comprised of a logic OR circuit.

23. The geometry translation processor of claim 21, wherein said clipping test circuit determines whether or not a plurality of the coordinate vectors as translated are within the display area on the basis of the comparison results stored in said shift register and the comparison results as sequentially input to said shift register for each of said vertexes.

24. The geometry translation processor of claim 23, wherein said logic circuit is comprised of a logic OR circuit.

* * * * *